United States Patent
Fuchs et al.

(10) Patent No.: US 7,424,359 B2
(45) Date of Patent: Sep. 9, 2008

(54) ANTI-SLIP CONTROL METHOD FOR A DRIVE SYSTEM IN A MOTOR VEHICLE

(75) Inventors: Emanuel Fuchs, Rochester, MI (US); Hubert Schumacher, Augsburg (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 11/785,566

(22) Filed: Apr. 18, 2007

(65) Prior Publication Data
US 2007/0192014 A1 Aug. 16, 2007

Related U.S. Application Data

(63) Continuation of application No. PCT/EP2005/010553, filed on Sep. 30, 2005.

(30) Foreign Application Priority Data
Oct. 20, 2004 (DE) .................. 10 2004 050 994

(51) Int. Cl.
*B60T 7/12* (2006.01)
(52) U.S. Cl. .............. 701/82; 701/70; 701/84; 701/94; 180/197
(58) Field of Classification Search ........... 701/70, 701/79, 82, 84, 94; 180/197, 233, 247; 477/174, 477/183
See application file for complete search history.

(56) References Cited

U.S. PATENT DOCUMENTS

| 5,018,595 A | 5/1991 | Hara et al. |
| 5,351,776 A * | 10/1994 | Keller et al. .................. 701/70 |
| 5,411,110 A * | 5/1995 | Wilson et al. ............... 180/247 |
| 6,125,314 A | 9/2000 | Graf et al. |
| 6,188,945 B1 | 2/2001 | Graf et al. |
| 6,350,217 B1 * | 2/2002 | Unterforsthuber .......... 477/174 |

FOREIGN PATENT DOCUMENTS

| DE | 196 37 210 A1 | 3/1998 |
| DE | 196 48 055 A1 | 6/1998 |
| JP | 64-62625 A | 3/1989 |
| JP | 3-237233 A | 10/1991 |
| JP | 2000-204992 A | 7/2000 |

OTHER PUBLICATIONS

German Office Action dated Aug. 23, 2005 w/English translation (Five (5) pages).
International Search Report dated Dec. 27, 2005 w/English translation (Six (6) pages).

* cited by examiner

*Primary Examiner*—Gertrude Arthur Jeangla
(74) *Attorney, Agent, or Firm*—Crowell & Moring LLP

(57) ABSTRACT

A method for controlling a drive system in a motor vehicle having at least one electronic control device, which detects the accelerator pedal position as an input signal and therefrom, corresponding to a basic characteristic curve, determines a wheel torque desired by the driver, the control device receives information concerning the presence of wheel slip as another input signal and, when wheel slip is present, stores a limit torque. For an accelerator pedal position which is greater than the accelerator pedal position at which the wheel slip has occurred, the basic characteristic curve is changed in that the desired wheel torque is limited to the limit torque.

4 Claims, 1 Drawing Sheet

ANTI-SLIP CONTROL METHOD FOR A
DRIVE SYSTEM IN A MOTOR VEHICLE

This application is a Continuation of PCT/EP2005/010553, filed Sep. 30, 2005, and claims the priority of DE 10 2004 050 994.8, filed Oct. 20, 2004, the disclosures of which are expressly incorporated by reference herein.

BACKGROUND AND SUMMARY OF THE INVENTION

The invention relates to a method of controlling a drive system in a motor vehicle having an electronic control device which determines a desired wheel torque from an accelerator pedal position.

Such a method is known, for example, from German Patent Document 196 37 210 A1. In the case of this known method, on the one hand, the wheel torque demanded by way of the accelerator pedal and, on the other hand, a conglomeration of various operating parameters are processed with one another in a central unit in a manner not shown in detail for controlling the drive system.

It is an object of the invention to improve a method of controlling a drive system in a motor vehicle with a view to optimizing comfort.

The invention is based on the following recognition:

By the method according to the invention, a control strategy for drive systems in motor vehicles in the event of insufficient friction conditions is to be created of a variable interpretation of the power control element (accelerator pedal). Here, the following state of the art is used as the basis: The spinning tendency or the wheel slip is conventionally sensed by stability regulating control devices (such as ESP, DSC) and is also transmitted as information to other control devices, particularly to engine control devices for controlling an internal-combustion engine and/or, as required, to transmission control devices for controlling automatic transmissions. In the event of the occurrence of slip, the engine control device first reduces the total wheel torque at the driven wheels by means of an intervention in the torque control of the internal-combustion engine or of the engine. As a rule, it is assumed in this case that the ratio of the transmission does not change during the regulating operation. Furthermore, transmission control devices are known which themselves react to the spin tendency of the driving wheels, in that, by changing the effective ratio, they reduce the total wheel torque until the determined wheel slip has been reduced. Finally, a wheel torque reduction can also be carried out by the braking system or by the stability regulating control devices.

The invention suggests an integrated approach in which the accelerator pedal is used as a power control element and, by way of its variable interpretation, to power output to the wheels is controlled such that occurring wheel slip is first reduced and is avoided during the subsequent regulating, in order to minimize the necessity of a complex coordination of a wheel torque control by several individual components.

It is assumed that the accelerator pedal is used as a power control element. The accelerator pedal position or the sensor signal value reflecting the accelerator pedal position therefore controls the power output or the torque output from the internal-combustion engine to the wheels. The wheel torque is obtained from the power supplied to the wheels minus the losses in the transmission line divided by the applied speed or velocity. The term wheel torque quantity should also be understood to be any quantity proportional to the wheel torque.

The signal emitted by the accelerator pedal proportionally to its position, is converted to a power demand or to a desired wheel torque in a characteristic curve or a characteristic diagram while additionally being a function of the speed and other parameters. The interrelationship between the input value and the output value of the characteristic curve or of the characteristic diagram can be dynamically corrected. In the following, these characteristic curves or characteristic diagrams will be called a basic characteristic curve in a summarizing fashion because, as a matter of priority, the invention relates to the dependence of the desired wheel torque on the accelerator pedal position. The characteristic curves according to the invention can therefore also be found in characteristic diagrams if the dependence on additional parameters is important.

The desired wheel torque or the demanded power is provided by the engine in the form of torque and pertaining rotational speed. In the transmission line, an automatic transmission provides that the rotational engine speed is adjusted which is required for the demanded power.

Other objects, advantages and novel features of the present invention will become apparent from the following detailed description of the invention when considered in conjunction with the accompanying drawings.

DETAILED DESCRIPTION

Figure 1:
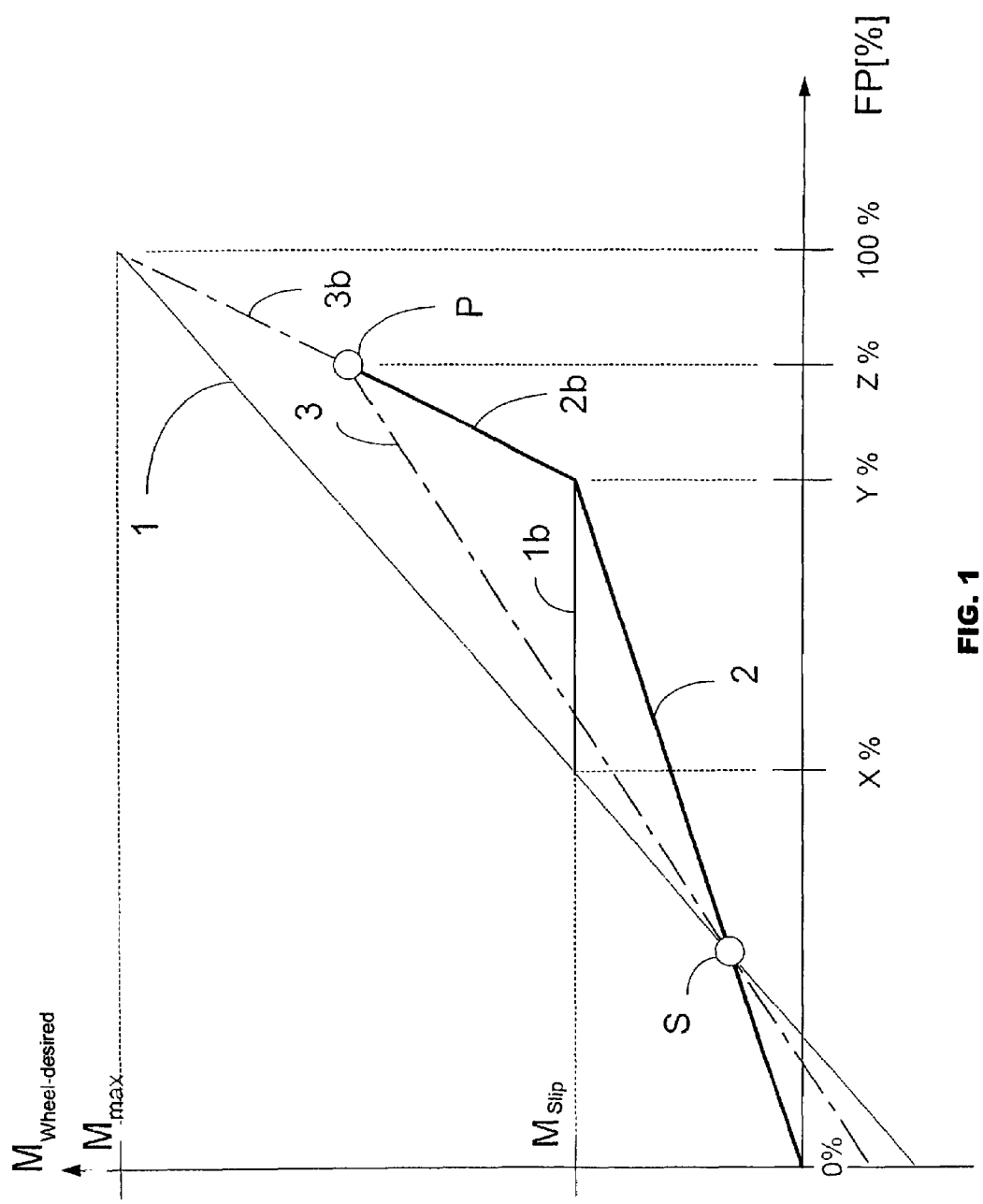
FIG. 1 is an illustration of characteristic curves used to explain the method of the present invention.

The method according to the invention, which is carried out by an electronic control device, will be explained in detail by means of characteristic curves illustrated in the drawing.

The electronic control device, for example, an internal-combustion engine control device and/or an automatic transmission control device present anyhow and not shown, receives the accelerator pedal position FP as an input signal as well as information concerning the presence of wheel slip. Corresponding to stored characteristic curves or characteristic diagrams, the control device determines a wheel torque $M_{wheel-desired}$ desired by the driver as a function of the accelerator pedal position FP and, as required, as a function of additional operating parameters not explained here in detail.

For the method according to the invention, only the dependence on the accelerator pedal position PD will be explained when determining the desired wheel torque $M_{wheel-desired}$ or the power demand.

When no wheel slip is present, the basic characteristic curve 1 is decisive for a basic assignment of a desired wheel torque $M_{wheel-desired}$ to an accelerator pedal position FP.

When wheel slip is present, a limit torque $M_{slip}$ is stored. The limit torque, as a wheel torque which can just barely still be supported by the road as a function of the coefficient of friction, can be determined in different manners.

For example, in the event of a torque change, the observed wheel torque in the case of a wheel breakaway can be predefined as the limit torque. For this purpose, in the presence of a wheel slip, the actual wheel torque can be reduced such that barely no wheel slip occurs, and this actual wheel torque can be stored in the control device as a limit torque $M_{slip}$.

Particularly also in the event of a wheel breakaway, while the torque is constant, the limit torque can be formed from the difference between the driving torque and the torque to be applied for the running-up of the wheels (in the case of a known moment of inertia of the transmission line). During a running-up of the wheels, the difference of the angular accelerations between the power wheels and the non-powered wheels has to be overcome.

The accelerator pedal position X %, at which the wheel slip has occurred, is also stored in the control device. For an accelerator pedal position FP, which is greater than the accelerator position X % at which the wheel slip has occurred, the basic characteristic curve 1 is changed or left in that the desired wheel torque $M_{wheel\text{-}desired}$ is limited to the limit torque $M_{slip}$. The characteristic curve 1b for FP>X % is thereby obtained. This applies until the accelerator pedal position FP returns into the zero position 0%.

When the accelerator pedal position FP returns to the zero position 0%, the control device stores the previously maximally reached accelerator position Y % after the occurrence of the wheel slip. It is a prerequisite that no additional wheel slip has occurred by then. In the event of another increase of the accelerator pedal position FP out of the zero position 0%, instead of the changed basic characteristic curve 1 and also instead of the changed basic characteristic curve 1b, the control device predefines a power-limiting, continuously increasing characteristic curve 2 between the zero position 0% and the previously maximally reached accelerator position Y %. This characteristic curve 2 reaches its maximum in the form of the limit torque $M_{slip}$ as the desired wheel torque $M_{wheel\text{-}desired}$ at the previously maximally reached accelerator pedal position Y %. The characteristic curve 2 preferably has a linear course and, as required, starts at a desired wheel torque from zero. Here, the sliding wheel torque demand normally predefined corresponding to the basic characteristic curve 1, which may result in a roll steer effect of the chassis, is abandoned for reasons of a maximal directional control, particularly also when slip occurs.

When the previously maximally reached accelerator pedal position Y % is exceeded, the control device predefines a power-maximizing characteristic curve 2b, by which the desired wheel torque $M_{wheel\text{-}desired}$, starting at the limit torque $M_{slip}$, rises continuously from the previously maximally reached accelerator pedal position Y % to the maximally possible desired wheel torque $M_{max}$ at the maximally possible accelerator pedal position 100%. However, this is possible only as long as no further wheel slip is present, because otherwise a limit torque has to be predefined again (corresponding to the characteristic curve 1b). The characteristic curves 2 and 2b will be in effect until an accelerator pedal position has been reached which is higher in comparison to the previously maximally reached accelerator pedal position Y %. The control device at least always stores the respectively maximally reached accelerator pedal position FP.

When an accelerator pedal position FP>Y % has been reached which is increased in comparison to the previously maximally reached accelerator pedal position Y %, and the accelerator pedal position has again returned to the zero position (0%), and by then, no new wheel slip has occurred, the control device will proceed as follows:

The accelerator pedal position Z % maximally reached before the new return and increased in comparison to the previously maximally reached accelerator pedal position Y % remains stored. A further new characteristic curve 3 in the form of a straight line is indicated between the zero position 0% and the increased maximal accelerator pedal position Z %, which straight line is defined by the point of intersection S of the basic characteristic curve 1 with the power-limiting characteristic curve 2 and by point P of the power-maximizing characteristic curve 2b assigned to the increased maximal accelerator pedal position Z %. The maximum of this characteristic curve 3 is the return to the basic characteristic curve 1 when the increased maximal accelerator pedal position is equal to the maximally possible accelerator position of 100%. Thus, when a high frictional connection between the wheels and the road exists again, the maximally conceivable power is made available again as rapidly as possible, if it is demanded by the driver.

This variable accelerator pedal characteristic, which can be called a "slip control pedal" contributes considerably to the reduction of the required intervention for reducing power in the event of an insufficient frictional connection of the wheels and thus to improving comfort. An optimized overall vehicle handling can also be achieved in a simple manner with respect to programming.

Problems are eliminated, such as damage to the catalyst as a result of long-lasting advance angle interventions, which are necessary for the conventional slip control (with DSC or ESP systems) because of the requirement of a fast upward load control.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of controlling a drive system in a motor vehicle, the drive system having at least one electronic control device, comprising the acts of:
    detecting an accelerator pedal position as an input signal to the at least one electronic control device;
    determining from the accelerator pedal position input and a basic characteristic curve, a wheel torque desired by the driver;
    detecting a presence of wheel slip as an additional input signal to the at least one electronic control device;
    storing the determined wheel torque as a limit torque when wheel slip is detected; and
    changing the basic characteristic curve such that for an accelerator pedal position which is greater than the accelerator pedal position at which the wheel slip has occurred, the desired wheel torque in the basic characteristic curve is limited to the limit torque.

2. The method according to claim 1, further comprising the acts of:
    after a return of the accelerator pedal position to the zero position, storing a maximum accelerator pedal position reached after the detection of wheel slip; and
    further changing the basic characteristic curve in the event of a new increase of the accelerator pedal position out of the zero position, such that a power-limiting, continuously increasing characteristic curve is provided between the zero position and said maximum accelerator pedal position, said basic characteristic curve having the desired wheel torque limited to the limit torque at said maximum accelerator pedal position.

3. The method according to claim 2, further comprising the acts of:
    when said maximum accelerator pedal position is next exceeded, changing the basic characteristic curve to a power-maximizing characteristic curve, wherein the desired wheel torque, starting at the limit torque, rises continuously from said maximum accelerator pedal position to a maximum desired wheel torque at a maximum accelerator pedal position.

4. The method according to claim 3, further comprising the acts of:

after a return of the accelerator pedal position to the zero position following exceeding of said maximum accelerator pedal position to a new maximum accelerator pedal position and if no new wheel slip has occurred, changing the power-maximizing characteristic curve, wherein the characteristic curve is changed to a straight line between the zero position and the new maximum accelerator pedal position, the straight line being defined by a first point at which the basic characteristic curve intersects the power-limiting characteristic curve and by second point on the previous power-maximizing characteristic curve corresponding to said further maximum accelerator pedal position.

\* \* \* \* \*